United States Patent
Kim et al.

(10) Patent No.: US 9,790,652 B1
(45) Date of Patent: Oct. 17, 2017

(54) VARIABLE TRAFFIC SAFETY SIGN FOR DISPLAYING ROADBED CONDITIONS IN RESPONSE TO CHANGES IN TEMPERATURE AND HUMIDITY

(71) Applicant: KOREA INSTITUTE OF CIVIL ENGINEERING AND BUILDING TECHNOLOGY, Gyeonggi-do (KR)

(72) Inventors: Hyeong Yeol Kim, Gyeonggi-do (KR); Jong Sup Park, Gyeonggi-do (KR)

(73) Assignee: KOREA INSTITUTE OF CIVIL ENGINEERING AND BUILDING TECHNOLOGY, Gyeonggi-do (KR)

( * ) Notice: Subject to any disclaimer, the term of this patent is extended or adjusted under 35 U.S.C. 154(b) by 0 days.

(21) Appl. No.: 15/364,214

(22) Filed: Nov. 29, 2016

(30) Foreign Application Priority Data

Nov. 11, 2016 (KR) .......................... 10-2016-0150533

(51) Int. Cl.
| | |
|---|---|
| *E01F 9/40* | (2016.01) |
| *G09F 13/20* | (2006.01) |
| *G09F 13/16* | (2006.01) |
| *G09F 19/12* | (2006.01) |

(Continued)

(52) U.S. Cl.
CPC ................ *E01F 9/40* (2016.02); *G02F 1/009* (2013.01); *G09F 13/16* (2013.01); *G09F 13/20* (2013.01); *G09F 19/12* (2013.01); *G09F 19/22* (2013.01); *G09F 19/228* (2013.01)

(58) Field of Classification Search
CPC ........... E01F 9/40; G09F 19/228; G02F 1/009
See application file for complete search history.

(56) References Cited

U.S. PATENT DOCUMENTS

| | | | | |
|---|---|---|---|---|
| 3,540,282 A | * | 11/1970 | Wolfgang | ................ E01F 9/40 |
| | | | | 116/217 |
| 4,862,613 A | * | 9/1989 | Eyngorn | ................ G02B 6/006 |
| | | | | 40/546 |
| 5,897,271 A | | 4/1999 | Widmer | |

(Continued)

FOREIGN PATENT DOCUMENTS

| | | | | |
|---|---|---|---|---|
| CN | 103981819 B | * | 8/2014 | .............. E01F 9/518 |
| DE | 19859895 A1 | * | 6/2000 | ................ C09K 9/02 |

(Continued)

OTHER PUBLICATIONS

Machine translation of CN 103981819(B).*
EIC3600 Search Report.*

Primary Examiner — Kristina N Junge
(74) Attorney, Agent, or Firm — Jianq Chyun IP Office

(57) ABSTRACT

A variable traffic safety sign is useful in informing road users of the possibility of a surface of a road or bridge section being wet or frozen without using an additional external power source by exactly expressing freezing and wet roadbed conditions of the road or bridge section using a thermochromic paint and a humidity indicator paint, and also allowing road drivers to exactly recognize the roadbed conditions of the road or bridge section by displaying the freezing and wet roadbed conditions of the road or bridge section conditions in response to changes in temperature and humidity, respectively. Also, the variable traffic safety sign is readily applicable to structures such as a bridge crash barrier, a traffic safety sign board, a bridge guardrail, a road shoulder, and an inner part, entrance and exit of a tunnel.

15 Claims, 14 Drawing Sheets

(51) Int. Cl.
*G09F 19/22* (2006.01)
*G02F 1/00* (2006.01)

(56) References Cited

U.S. PATENT DOCUMENTS

| | | | |
|---|---|---|---|
| 8,840,335 B2 | 9/2014 | Martin et al. | |
| 2002/0149003 A1* | 10/2002 | Lucht | G01N 31/229 252/408.1 |
| 2008/0060242 A1* | 3/2008 | Greer | G09F 19/22 40/612 |
| 2012/0324619 A1* | 12/2012 | Drago | A43B 3/0084 2/93 |
| 2014/0343854 A1* | 11/2014 | Wollard | G09F 13/005 702/3 |

FOREIGN PATENT DOCUMENTS

| | | |
|---|---|---|
| JP | H08-022259 | 1/1996 |
| JP | 2003-193440 | 7/2003 |
| KR | 10-0419758 | 2/2004 |
| KR | 10-0788403 | 12/2007 |
| KR | 10-0804673 | 2/2008 |
| KR | 10-1106587 | 1/2012 |
| KR | 2014-0111053 | 9/2014 |
| KR | 2015-0081585 | 7/2015 |

\* cited by examiner

HUMIDITY INDICATOR CARD (HIC)

10%  20%  30%  40%  50%  60%

| RELATIVE HUMIDITY / INGREDIENT | 10% | 20% | 30% | 40% | 50% | 60% |
|---|---|---|---|---|---|---|
| COPPER(II)SULFATE PENTAHYDRATE | 4.1 | 5.5 | 6.5 | 8.1 | 9.1 | 9.1 |
| SODIUM BROMIDE | 12.3 | 16.5 | 19.5 | 24.3 | 27.3 | 45.5 |
| WATER | 900 | 900 | 900 | 900 | 900 | 900 |
| 10% CELLULOSE SOLUTION | 100 | 100 | 100 | 100 | 100 | 100 |
| DYE SOLUTION | 9.4 | 9.4 | 9.4 | 9.4 | 9.4 | 9.4 |

VARIABLE TRAFFIC SAFETY SIGN FOR DISPLAYING ROADBED CONDITIONS IN RESPONSE TO CHANGES IN TEMPERATURE AND HUMIDITY

CROSS-REFERENCE TO RELATED APPLICATION

This application claims priority to and the benefit of Korean Patent Application No. 10-2016-0150533, filed on Nov. 11, 2016, the disclosure of which is incorporated herein by reference in its entirety.

BACKGROUND

1. Field of the Invention

The present invention relates to a variable traffic safety sign for roads and highways, and more particularly, to a variable traffic safety sign for variably displaying wet roadbed and freezing conditions of a road or bridge section in the form of a figure or characters using a thermochromic paint and a paint for a humidity indicator card ("HIC") so as to inform road users of the possibility of a surface of the road or bridge section being wet or frozen.

2. Discussion of Related Art

Generally, wet surfaces and freezing are main causes of traffic accidents caused due to vehicle slipping occurring on surfaces of roads. In particular, since a bottom surface of a bridge section is exposed to the air, a surface of the bridge section has a high possibility of being frozen, compared to a surface of a road having terrestrial heat.

FIG. 1 is a diagram showing a side view a conventional bridge section being exposed to the air.

As shown in FIG. 1, if the bottom surface of the bridge section is exposed to the air, pavement of the bridge has a high possibility of being frozen when the temperature drops below the freezing point, resulting in a further increased risk for accidents. In particular, drivers may inadvertently mistake a wet road surface for shade at night when it is difficult to visually identify whether a surface of the road is wet or frozen due to the drivers' poor visibility, or when a thin freezing film referred to as 'black ice' occurs on the road, which results in a very high risk for accidents.

The road management agency or authority has installed traffic safety sign boards at bridge entry to inform drivers of such a possibility of surfaces of the bridge entry being wet or frozen, as shown in FIGS. 2A to 2D.

FIGS. 2A to 2D are images showing examples of traffic safety sign boards installed at bridge entry according to the prior art. Here, the traffic safety sign boards for displaying wet roadbed and freezing conditions are installed at the bridge entry.

However, such traffic safety sign boards may not easily attract drivers since the traffic safety sign boards are always installed at fixed places, and also always require constant attention regardless of current roadbed conditions, and thus are not really helpful for safe driving.

Meanwhile, since the road is wet with moisture due to rain, snow, dew, and the like, an increase in humidity in the air or on the road surface increases a possibility of a surface of the road being wet. Also, when the temperature of the air or road surface drops below the freezing point, moisture present on or around the road, for example rain, snow, dew, water vapor and the like, is changed into ice crystals. Accordingly, as the temperature of the road or the air drops below the freezing point under a high humidity condition, a surface of the road is highly likely to be frozen.

To solve the above problems, as prior-art documents, Japanese Patent Laid-open Publication No. 1996-22259 titled "Road Sign" discloses a road sign capable of easily and quickly displaying dangerous road conditions caused by the air, and Japanese Patent Laid-open Publication No. 2003-193440 titled "Roadbed Marker" also discloses a roadbed marker whose color is changed according to conditions such as a temperature, where the roadbed marker may be simply displayed to call drivers' attention to the surrounding conditions such as road surface freezing, etc.

Also, as another prior-art document, Korean Unexamined Patent Application Publication No. 2015-0081585 discloses a "Paint Composition for Indicating Whether the Ground is Frozen." Referring to FIG. 3A and FIG. 3B, the paint composition will be described.

FIG. 3A and FIG. 3B are a diagram schematically showing a principle of displaying whether or not the ground is frozen using a paint composition according to the prior art.

Referring to FIG. 3A, the paint composition for displaying whether or not the ground is frozen according to the prior art may display whether or not the ground is frozen as the paint composition changes in color by sensing the moisture and temperature of the ground. In this case, the paint composition includes 10 to 30 parts by weight of a temperature-sensing material which changes in color at a temperature of 32° F. or less, and a 10 to 30 parts by weight of a moisture-sensing material which changes in color by sensing moisture, based on 100 parts by weight of the paint.

When the paint composition for displaying whether or not the ground is frozen according to the prior art is applied to traffic lanes of highways, the paint composition may sense a temperature of 32° F. or less, and a change in moisture on a surface of a road caused due to rain or snow, as shown in FIG. 3B. In this way, the paint composition may display a change in color of the traffic lanes, thereby visually displaying that the ground is frozen.

However, the paint composition for displaying whether or not the ground is frozen according to the prior art may display whether the ground is merely frozen because it is formed to include both the temperature-sensing material and the moisture-sensing material. Therefore, the paint composition has a problem in that it is difficult to exactly display the roadbed conditions of the road.

Meanwhile, FIG. 4A and FIG. 4B are diagrams for explaining a humidity indicator card according to the prior art. Here, FIG. 4A shows a humidity indicator card having regions for detecting a relative humidity of 10%, 20%, 30%, 40%, 50% and 60%, and FIG. 4B shows compositions of a paint for a humidity indicator card, which are formed by mixing copper (II) sulfate pentahydrate, sodium bromide, water and a dye solution to detect various relative humidity levels.

As shown in FIGS. 4A and 4B, a humidity indicator card may be used to determine a relative humidity, and compositions of the paint for a humidity indicator card may be varied to detect various relative humidity levels.

According to the prior art, an additional external power source should be used to inform road users of roadbed conditions such as a freezing or wet roadbed conditions of the road or bridge section, or the above-mentioned paint composition for displaying whether the ground is frozen has a problem in that it is difficult to exactly display the roadbed conditions of the road since the paint composition displays only whether or not the ground is frozen.

SUMMARY OF THE INVENTION

Therefore, embodiments of the present invention are designed to solve the problems of the prior art, and it is an objective of the present invention to provide a variable traffic safety sign for displaying roadbed conditions in response to changes in temperature and humidity, which is capable of informing road users of the possibility of a surface of a road or bridge section being wet or frozen without using an additional external power source by exactly expressing freezing and wet roadbed conditions of the road or bridge section using a thermochromic paint and a humidity indicator paint.

It is another objective of the present invention to provide a variable traffic safety sign for displaying roadbed conditions in response to changes in temperature and humidity, which is capable of allowing road drivers to exactly recognize the roadbed conditions of the road or bridge section by displaying the freezing and wet roadbed conditions of the road or bridge section in response to changes in temperature and humidity, respectively.

According to an aspect of the present invention, there is provided a variable traffic safety sign for displaying roadbed conditions in response to changes in temperature and humidity, which includes a general paint applied onto the traffic safety sign for use as a background color, a first thermochromic paint formed of a first thermochromic material and applied to develop a color at a predetermined temperature so as to set an interface with the general paint, a second thermochromic paint for freezing display formed of a second thermochromic material, which develops a color at a lower temperature than the first thermochromic material, and applied onto an inner side of the interface set with the first thermochromic paint to display freezing conditions of the road or bridge section, a first humidity indicator paint formed of a material for a first humidity indicator card and applied to develop a color at a predetermined relative humidity so as to set an interface with the general paint, and a second humidity indicator paint formed of a material for a second humidity indicator card, which develops a color at a higher humidity than the material for a first humidity indicator card, and applied onto an inner side of the interface set with the first humidity indicator paint to display wet roadbed conditions of the road or bridge section. Here, the first and second thermochromic paints and the first and second humidity indicator paints display freezing and wet roadbed conditions of the road or bridge section, respectively, without using an external power source.

Here, a color developing temperature of the first thermochromic paint and a color developing humidity of the first humidity indicator paint may be adjusted in response to field situations of the road or bridge section.

Here, the color developing temperature of the first thermochromic paint may be the freezing point of 0° C., and the color developing humidity of the humidity indicator paint may be a relative humidity of 80%.

Here, a shape formed by the first and second thermochromic paints may be a figure including a snowflake shape or characters including "CAUTION: ICY ROAD" or "BRIDGE ICES" so that drivers in vehicles running on a road at a regulation speed can quickly and easily recognize the possibility of a surface of the road being frozen.

Here, the figure and the characters may allow a color index according to the absolute temperature value to appear on a traffic safety sign board at the same time so that road drivers can check a current outdoor temperature.

Here, a shape formed by the first and second humidity indicator paints may be a figure including a waterdrop shape or characters including "WET ROAD" or "WET SURFACE" so that drivers in vehicles running on the road at a regulation speed can quickly and easily recognize the possibility of a surface of the road being wet.

Here, the figure and the characters may allow a color index according to the absolute humidity value to appear on a traffic safety sign board at the same time so that road drivers can check a current outdoor absolute humidity.

The variable traffic safety sign for displaying roadbed conditions in response to changes in temperature and humidity according to the present invention may further include a light-reflecting paint formed of a light-reflecting material and applied onto an inner side of the general paint so that drivers driving on the road or bridge can secure visibility at night.

The variable traffic safety sign for displaying roadbed conditions in response to changes in temperature and humidity according to the present invention may further include a luminous paint formed of a luminous material and applied onto an outer side of the general paint so that drivers driving on the road or bridge section can secure visibility at night.

According to another aspect of the present invention, a structure in which a variable traffic safety sign for variably displaying roadbed conditions in response to changes in temperature and humidity is provided, which includes a variable traffic safety sign for variably displaying roadbed conditions in response to changes in temperature and humidity to inform road users of the possibility of a surface of a road or bridge section being wet or frozen. Here, the variable traffic safety sign includes a general paint applied onto the traffic safety sign for use as a background color, a first thermochromic paint formed of a first thermochromic material and applied to develop a color at a predetermined temperature so as to set an interface with the general paint, a second thermochromic paint for freezing display formed of a second thermochromic material, which develops a color at a lower temperature than the first thermochromic material, and applied onto an inner side of the interface set with the first thermochromic paint to display freezing conditions of the road or bridge section, a first humidity indicator paint formed of a material for a first humidity indicator card and applied to develop a color at a predetermined relative humidity so as to set an interface with the general paint, and a second humidity indicator paint formed of a material for a second humidity indicator card, which develops a color at a higher humidity than the material for a first humidity indicator card, and applied onto an inner side of the interface set with the first humidity indicator paint to display wet roadbed conditions of the road or bridge section.

Here, the structure in which the variable traffic safety sign is installed may include one or more selected from the group consisting of a bridge crash barrier, a traffic safety sign board, a bridge railing, a road shoulder, and an inner part, entrance and exit of a tunnel.

BRIEF DESCRIPTION OF THE DRAWINGS

The above and other objectives, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
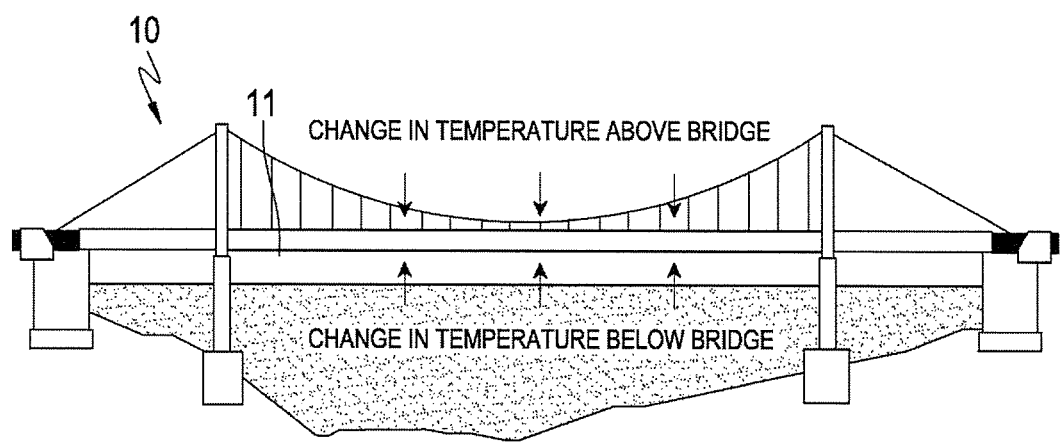
FIG. 1 is a diagram showing a bottom surface of a conventional bridge section being exposed to the air.
Figure 2A:
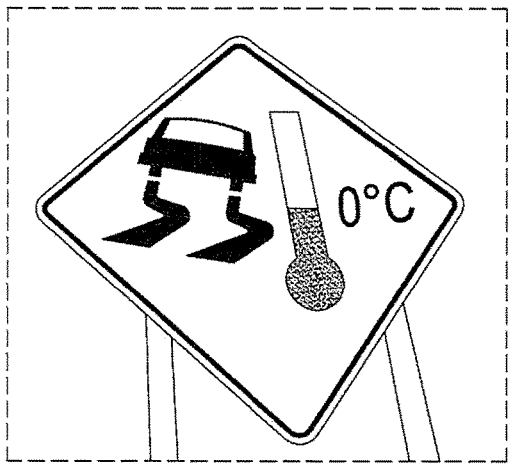
FIGS. 2A to 2D are images showing examples of traffic safety sign boards installed at bridge entry according to the prior art.
Figure 2B:
Figure 2C:
Figure 2D:
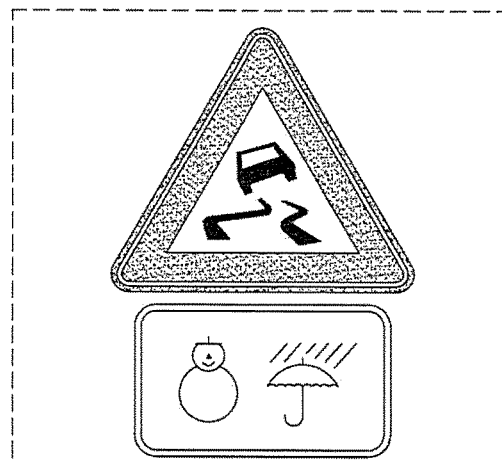
Figure 3A:
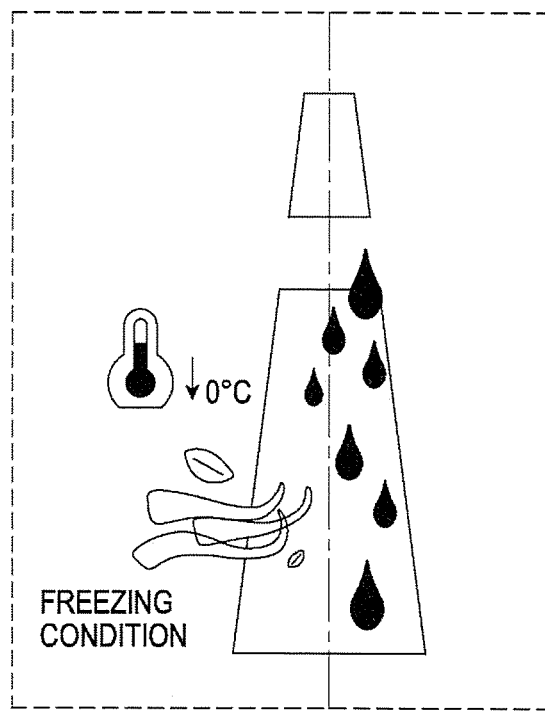
FIGS. 3A to 3B are diagrams schematically showing a principle of displaying whether or not the ground is frozen using a paint composition according to the prior art.
Figure 3B:
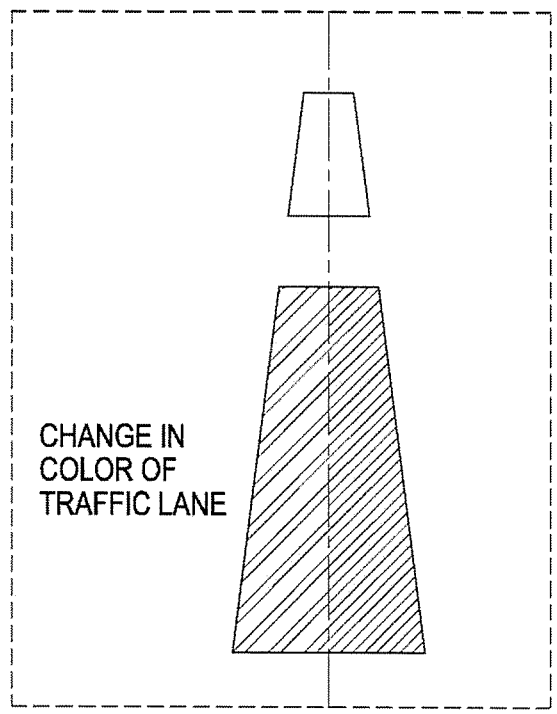
Figures 4A, 4B:
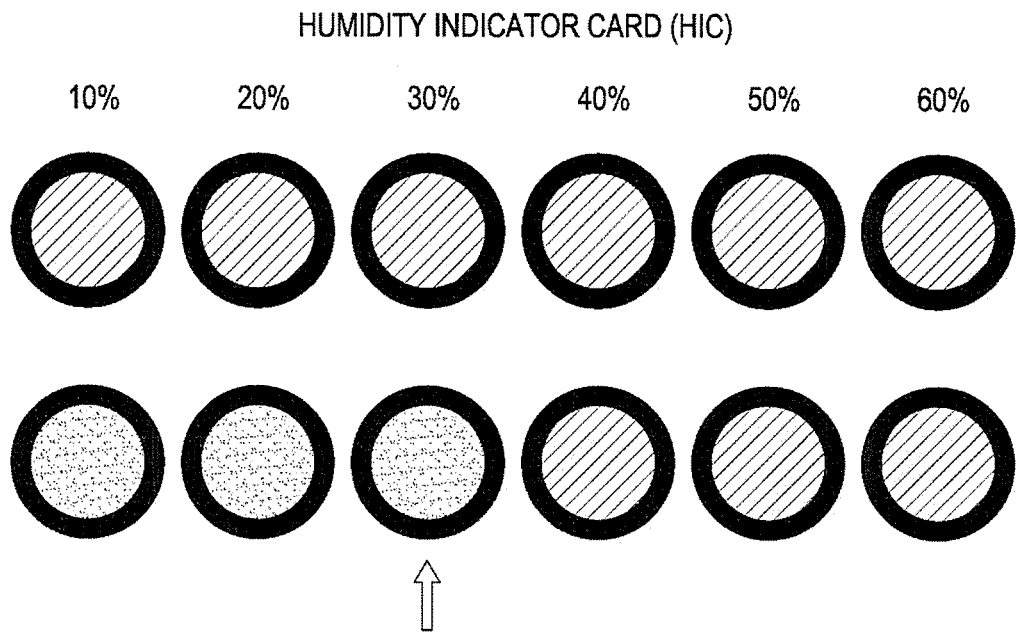
FIGS. 4A to 4B are diagrams for explaining a humidity indicator card according to the prior art.

Hereinafter, exemplary embodiments of the present invention will be described in detail with reference to the accompanying drawings so that those of ordinary skill in the art can carry out the present invention. However, it should be understood that the present invention can be implemented in various foal's, and is not intended to limit the exemplary embodiments of the present invention. Also, in the drawings, descriptions of parts unrelated to the detailed description are omitted to clearly describe the present invention. Throughout the specification, like numbers refer to like elements, and descriptions of the same elements will be not reiterated.

Unless the context clearly indicates otherwise throughout the specification, it will be further understood that the terms "comprises," "comprising," "includes" and/or "including," when used herein, specify the presence of stated features, integers, steps, operations, elements, components and/or groups thereof, but do not preclude the presence or addition of one or more other features, integers, steps, operations, elements, components and/or groups thereof.

[Variable Traffic Safety Sign 100 for Displaying Roadbed Conditions in Response to Changes in Temperature and Humidity]

First of all, a variable traffic safety sign for displaying roadbed conditions in response to changes in temperature and humidity according to one exemplary embodiment of the present invention expresses that a road has a high possibility of being wet or frozen in response to changes in humidity and temperature of the air and road. When such a humidity and temperature of the air and road are measured, it is difficult to secure an additional external power source when the road is spaced apart from a city. Therefore, the variable traffic safety sign for displaying roadbed conditions in response to changes in temperature and humidity according to one exemplary embodiment of the present invention should adopt a method of expressing the possibility of a surface of the road being wet or frozen without using an additional external power source in consideration of the economic feasibility of installation and management.

Figure 5A:
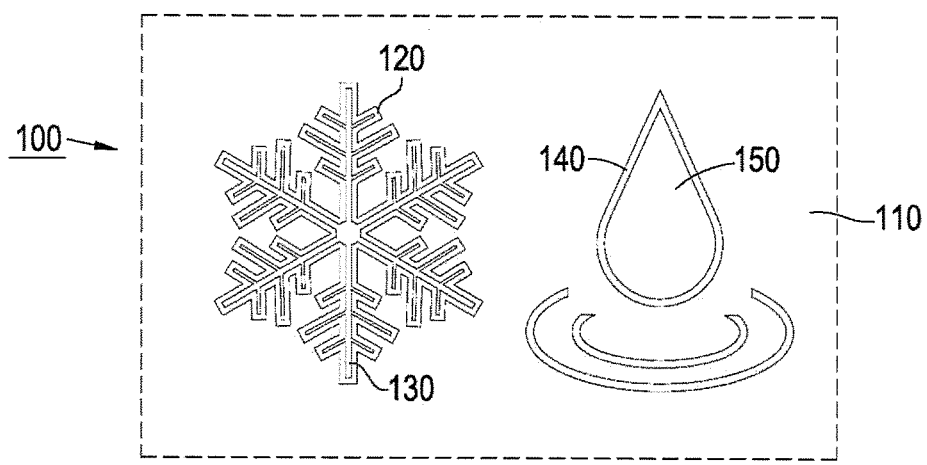
FIGS. 5A to 5C are diagrams for explaining a principle of a variable traffic safety sign for displaying roadbed conditions in response to changes in temperature and humidity according to one exemplary embodiment of the present invention.
Figure 5B:
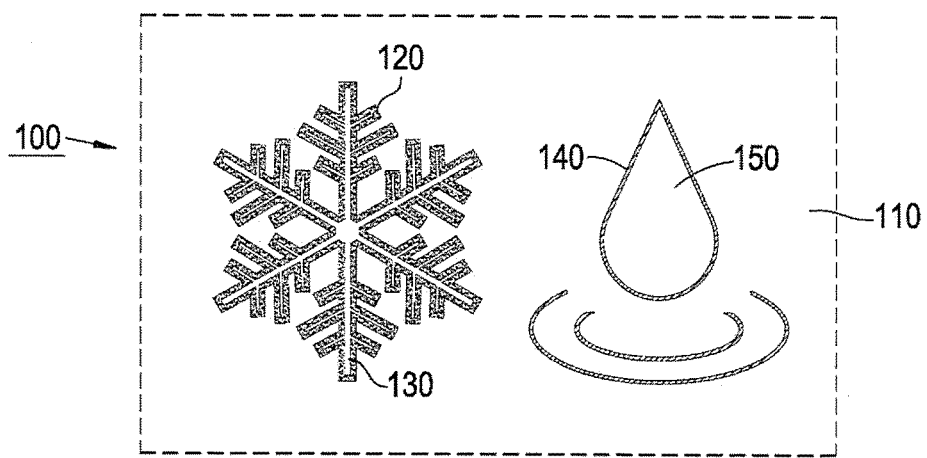
Figure 5C:
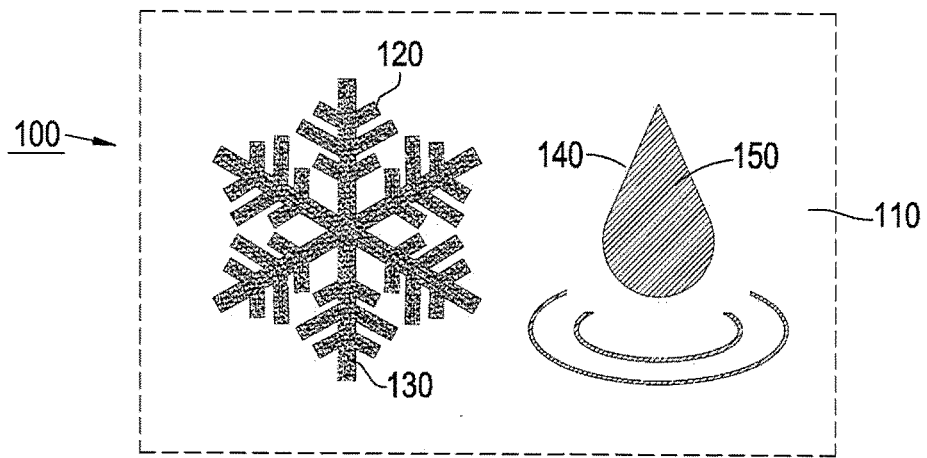

FIGS. 5A to 5C are diagrams for explaining a principle of the variable traffic safety sign for displaying roadbed conditions in response to changes in temperature and humidity according to one exemplary embodiment of the present invention. Here, FIG. 5A shows that a surface of a road or bridge section is not wet or frozen, FIG. 5B shows that the surface of the road or bridge section is wet or frozen.

Referring to FIGS. 5A to 5C, the variable traffic safety sign 100 for displaying roadbed conditions in response to changes in temperature and humidity according to one exemplary embodiment of the present invention is a traffic safety sign that displays roadbed conditions to inform road users of the possibility of a surface of the road or bridge section being wet or frozen, and includes a general paint 110, a first thermochromic paint 120, a second thermochromic paint 130, a first humidity indicator paint 140, and a second humidity indicator paint 150.

The general paint 110 is applied onto the traffic safety sign for use as a background color.

The first thermochromic paint 120 is formed of a first thermochromic material (or a heat-sensitive material), and applied to develop a color at a predetermined temperature so as to set an interface with the general paint 110. In the variable traffic safety sign 100 according to one exemplary embodiment of the present invention, a material that changes in color in response to a change in temperature is referred to as a thermochromic material or a heat-sensitive material. In this case, a thermochromic paint that changes in color in response to a change in temperature is used as the most general example thereof.

The second thermochromic paint 130 is formed of a second thermochromic material (or a second heat-sensitive material) that develops a color at a lower temperature than the first thermochromic material, and applied onto an inner side of the interface set with the first thermochromic paint to display freezing conditions of the road or bridge section. That is, the first thermochromic paint 120 is used to set an interface distinguishable from the interface set with the general paint 110. For example, a color developing temperature of the first thermochromic paint 120 may be the freezing point of 0° C. Also, the second thermochromic paint 130 is applied to develop a color at a lower temperature than the first thermochromic paint 120 after the interface is set with the first thermochromic paint 120 so as to display freezing conditions of the road or bridge section with more emphasis. For example, the color developing temperature of the second thermochromic paint 130 may be −5° C. (23° F.), but the present invention is not limited thereto.

In the variable traffic safety sign 100 according to one exemplary embodiment of the present invention, one or more snowflake shapes are painted using first and second thermochromic materials or a paint containing the first and second thermochromic materials. In this case, the painted snowflakes should have a size enough to allow vehicle drivers driving on a road at a legal speed to visually identify the snowflake shapes. For example, it is preferable that a snowflake painting gap is generally less than or equal to 1 km, which is a gap between road signs. Also, a color index according to the absolute temperature value may be displayed on a traffic safety sign board at the same time so that road drivers can check a current outdoor temperature, as necessary.

Specifically, the painted snowflakes change in color as the temperature drops, but the drivers may not identify a color corresponding to the temperature. Therefore, when the ambient background is painted with the general paint 110 and the like in the same color as expressed when the temperature of the air is above zero, and the snowflakes are painted on the background using the first and second thermochromic materials or the thermochromic paints, the color of the background may become distinct from the color of the snowflakes as the temperature of the air reaches the freezing point, thereby allowing the drivers to schematically identify that the temperature of the air has reached the freezing point.

Also, a method of expressing a freezing temperature may also be realized in the form of characters rather than a figure. For example, characters such as "BRIDGE ICES" or "CAUTION: ICY ROAD" may also be further painted on a crash barrier whose background is painted with a general paint and the like so as to alert the driver to the possibility of a surface of a road being frozen.

The first humidity indicator paint 140 is formed of a material for a first humidity indicator card (HIC), and applied to develop a color at a predetermined relative humidity so as to set an interface with the general paint 110.

The second humidity indicator paint 150 is formed of a material for a second humidity indicator card (HIC), which develops a color at a higher humidity than the material for a first humidity indicator card, and applied onto an inner side of the interface set with the first humidity indicator paint 140 to display wet roadbed conditions of the road or bridge section. That is, the first humidity indicator paint 140 is used to set an interface distinguishable from the interface set with the general paint 110. For example, a color developing humidity of the first humidity indicator paint 140 may be a relative humidity of 80%. Also, the second humidity indicator paint 150 is applied to develop a color at a higher humidity than the first humidity indicator paint 140 after the interface is set with the first humidity indicator paint 140 so as to display wet roadbed conditions of the road or bridge section with more emphasis. For example, the color developing humidity of the second humidity indicator paint 150 may be a relative humidity of 85%, but the present invention is not limited thereto.

A method of measuring and expressing the humidity in the variable traffic safety sign 100 according to one exemplary embodiment of the present invention may be performed using a material applied to a humidity indicator card (HIC) which changes in color in response to a change in humidity. Generally used HIC materials include a cobalt chloride-based material and a copper chloride-based material. For example, a color of the cobalt chloride-based material distinctively changes from blue to red or dark brown and a color of the copper chloride-based material distinctively changes from colorless to red or dark brown as the humidity rises. Thus, the variable traffic safety sign board according to one exemplary embodiment of the present invention may display the humidity using such characteristics.

For example, one or more waterdrop shapes are painted on a side of a bridge crash barrier using a HIC material or a paint containing the HIC material. In this case, the painted waterdrops should have a size enough to allow vehicle drivers driving on the road at a legal speed to visually identify the waterdrop shapes. Also, a waterdrop painting gap is generally preferably less than or equal to 1 km, which is a gap between road signs.

Specifically, the painted waterdrops change in color in response to a change in humidity, but the drivers may not identify colors corresponding to the magnitude (%) of relative humidity and the temperature. Therefore, when the ambient background is painted with the general paint 110 and the like in the same color as expressed when the humidity is in a very low state, and the waterdrops are painted on the background using the HIC material or the HIC paint, the color of the background may become distinct from the color of the waterdrops as the humidity rises, thereby allowing the drivers to schematically identify the relative humidity. Also, a color index according to the absolute humidity value may be displayed on a traffic safety sign board at the same time so that road drivers can check a current outdoor absolute humidity, as necessary.

Also, as shown below in FIGS. 7A and 7B, a method of expressing such humidity may also be realized in the form of characters rather than a figure. For example, characters such as "WET ROAD" or "WET SURFACE" may also be further painted on a crash barrier whose background is painted with a general paint and the like so as to alert the driver to the possibility of a surface of a road being wet.

Figure 6A:
FIGS. 6A to 6B are diagrams illustrating the temperature displayed in the form of characters on the variable traffic safety sign for displaying roadbed conditions in response to changes in temperature and humidity according to one exemplary embodiment of the present invention.
Figure 6B:
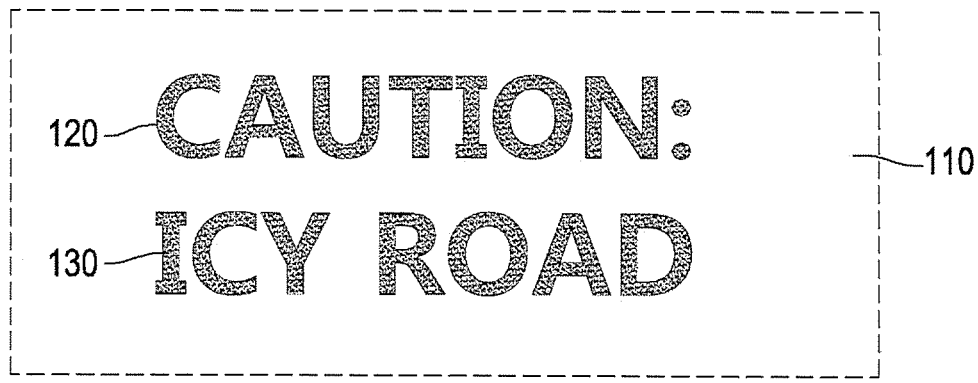
Figure 7A:
FIGS. 7A to 7B are diagrams illustrating the humidity displayed in the form of characters on the variable traffic safety sign for displaying roadbed conditions in response to changes in temperature and humidity according to one exemplary embodiment of the present invention.
Figure 7B:
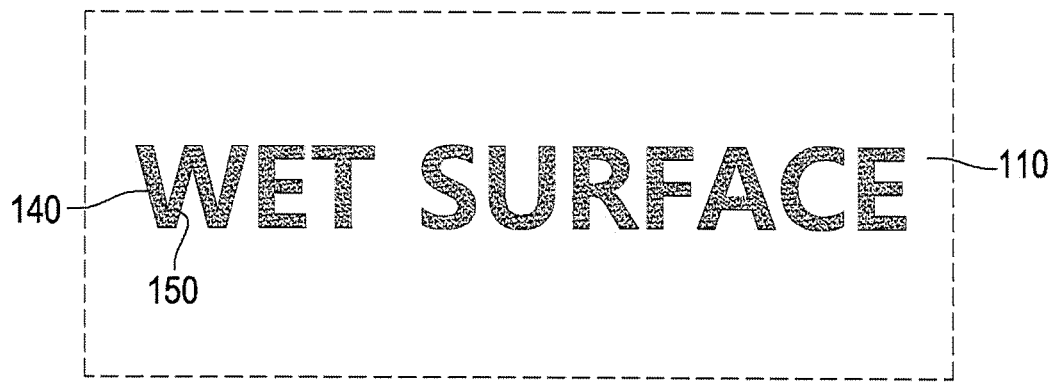

Meanwhile, FIGS. 6A and 6B are diagrams illustrating the temperature displayed in the form of characters on the variable traffic safety sign for displaying roadbed conditions in response to changes in temperature and humidity according to one exemplary embodiment of the present invention, and FIGS. 7A and 7B are diagrams illustrating the humidity displayed in the form of characters on the variable traffic safety sign for displaying roadbed conditions in response to changes in temperature and humidity according to one exemplary embodiment of the present invention.

When characters such as "CAUTION: ICY ROAD" are painted using the general paint 110 as a background color and using the first thermochromic paint 120 and the second thermochromic paint 130, it is difficult for drivers to visually identify the variable traffic safety sign if the temperature of the road or bridge section is not below the freezing point, as shown in FIG. 6A. However, when the temperature of the road or bridge section drops below the freezing point, the characters "CAUTION: ICY ROAD" may be expressed to allow the drivers to visually identify the variable traffic safety sign, as shown in FIG. 6B.

Also, when characters such as "WET SURFACE" are painted using the general paint 110 as a background color and using the first humidity indicator paint 140 and the second humidity indicator paint 150, it is difficult for drivers to visually identify the variable traffic safety sign if the humidity of the road or bridge section is not higher than the predetermined color developing humidity of the material for a first humidity indicator card, as shown in FIG. 7A. However, when the humidity of the road or bridge section rises above the predetermined color developing humidity of the material for a first humidity indicator card, the characters "WET SURFACE" may be expressed to allow the drivers to visually identify the variable traffic safety sign, as shown in FIG. 7B.

In this case, the first and second thermochromic paints 120 and 130 and the first and second humidity indicator paints 140 and 150 may display the freezing and wet roadbed conditions of the road or bridge section, respectively, without using an external power source. Also, the color developing temperature of the first thermochromic material and the color developing humidity of the material for a first humidity indicator card are preferably adjusted in response to field situations of the road or bridge section. For example, the color developing temperature of the first thermochromic material may be the freezing point of 0° C., and the color developing humidity of the material for a first humidity indicator card may be a relative humidity of 80%, but the present invention is not limited thereto.

Therefore, the shapes may be displayed at a dry condition or a temperature above zero, as shown in FIG. 5A, and may be displayed as the interface when the humidity or temperature reaches the color developing temperature of the first thermochromic material and the color developing humidity of the material for a first humidity indicator card, as shown in FIG. 5B. Then, the shapes may be displayed when the humidity or temperature exceeds a threshold value, as shown in FIG. 5C.

The variable traffic safety sign for displaying roadbed conditions in response to changes in temperature and humidity according to one exemplary embodiment of the present invention can be useful in informing road users of the possibility of a surface of a road or bridge section being wet or frozen without using an additional external power source by exactly expressing freezing and wet roadbed conditions of the road or bridge section using a thermochromic paint and a humidity indicator paint, and also allowing road drivers to exactly recognize the roadbed conditions of the road or bridge section by displaying the freezing and wet roadbed conditions of the road or bridge section conditions in response to changes in temperature and humidity, respectively.

[Structure in which a Variable Traffic Safety Sign 100 is Installed]

The variable traffic safety sign 100 for displaying roadbed conditions in response to changes in temperature and humidity according to one exemplary embodiment of the present invention may be applied to one or more structures such as a bridge crash barrier, a traffic safety sign board, a bridge guardrail, a road shoulder, and an inner part, entrance and exit of a tunnel.

FIGS. 8A to 8D are diagrams showing examples of variable traffic safety signs for displaying roadbed conditions in response to changes in temperature and humidity installed at sides of crash barriers according to one exemplary embodiment of the present invention.

Referring to FIGS. 8A to 8D, the variable traffic safety sign 100 for displaying roadbed conditions in response to changes in temperature and humidity according to one exemplary embodiment of the present invention may be installed at a side of a crash barrier 210.

Figure 8A:
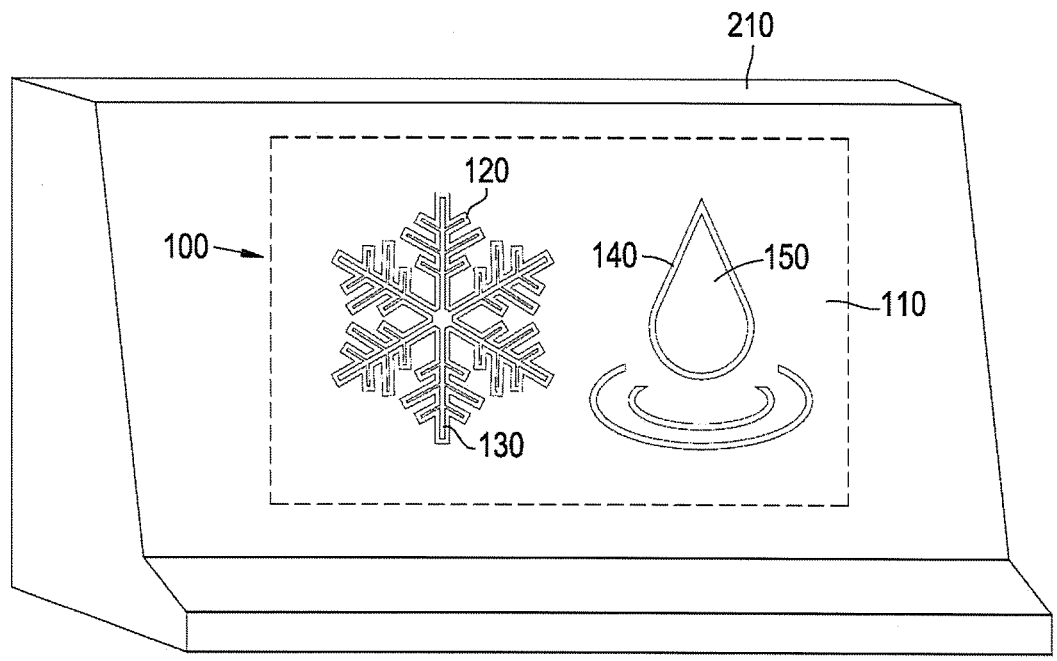
FIGS. 8A to 8D are diagrams showing examples of variable traffic safety signs for displaying roadbed conditions in response to changes in temperature and humidity installed at sides of crash barriers according to one exemplary embodiment of the present invention.

Specifically, the variable traffic safety sign 100 for displaying roadbed conditions in response to changes in temperature and humidity according to one exemplary embodiment of the present invention expresses a snowflake or waterdrop shape at a dry condition or a temperature above zero, as shown in FIG. 8A.

Figure 8B:
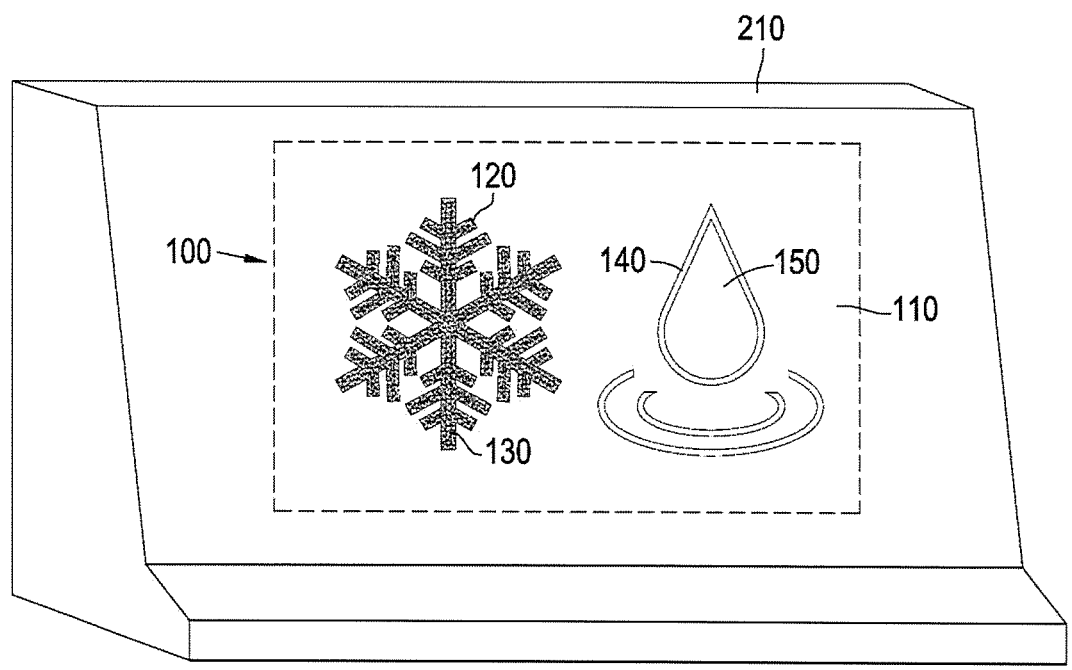

Also, the variable traffic safety sign 100 for displaying roadbed conditions in response to changes in temperature and humidity according to one exemplary embodiment of the present invention expresses only a snowflake shape using the first and second thermochromic paints 120 and 130 when the temperature of the road or bridge section drops below the color developing temperature of the first thermochromic material, for example, the freezing point of 0° C., and when the humidity does not rise to the color developing humidity of the material for a first humidity indicator card, for example, a relative humidity of 80%, as shown in FIG. 8B.

Figure 8C:
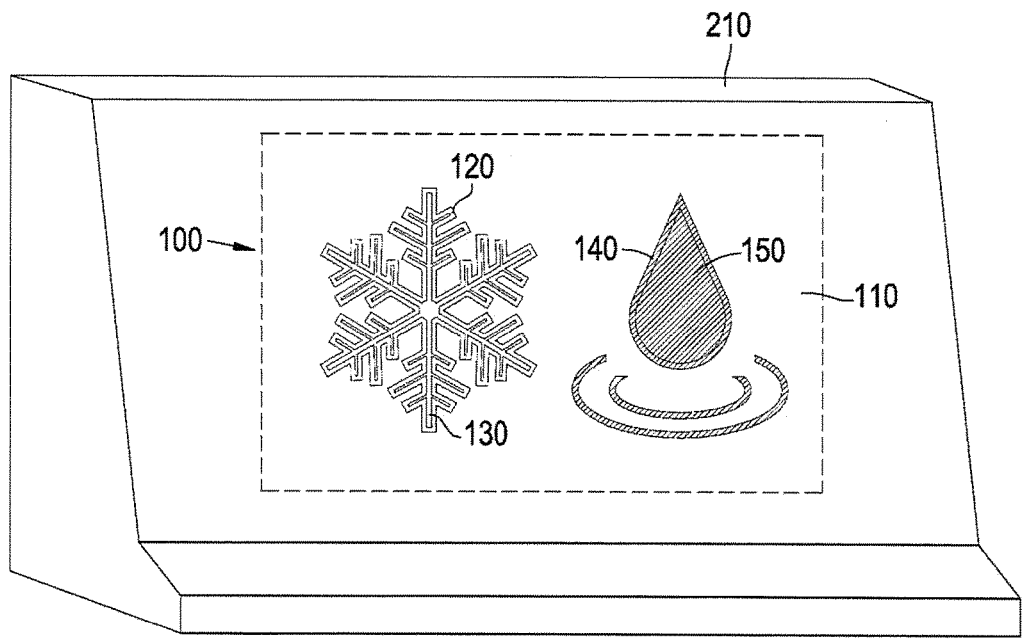

In addition, the variable traffic safety sign 100 for displaying roadbed conditions in response to changes in temperature and humidity according to one exemplary embodiment of the present invention expresses only a waterdrop shape using the first and second humidity indicator paints 140 and 150 when the temperature of the road or bridge section is higher than the color developing temperature of the first thermochromic material, for example, the freezing point of 0° C., and when the humidity rises to the color developing humidity of the material for a first humidity indicator card, for example, a relative humidity of 80%, as shown in FIG. 8C.

Figure 8D:
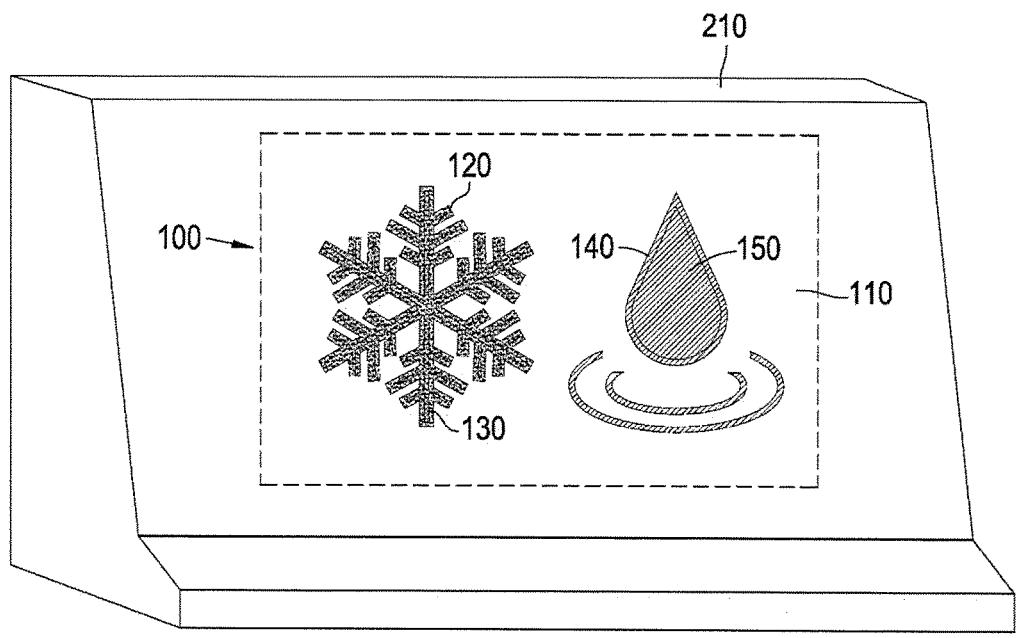

Further, the variable traffic safety sign 100 for displaying roadbed conditions in response to changes in temperature and humidity according to one exemplary embodiment of the present invention expresses a snowflake shape using the first and second thermochromic paints 120 and 130, and simultaneously expresses a waterdrop shape using the first and second humidity indicator paints 140 and 150 when the temperature of the road or bridge section is lower than the color developing temperature of the first thermochromic material, for example, the freezing point of 0° C., and the humidity rises to the color developing humidity of the material for a first humidity indicator card, for example, a relative humidity of 80% as well, as shown in FIG. 8D. Therefore, the drivers driving on the road or bridge section may recognize that the roadbed conditions of the road or bridge section are dangerously bad.

Figure 9A:
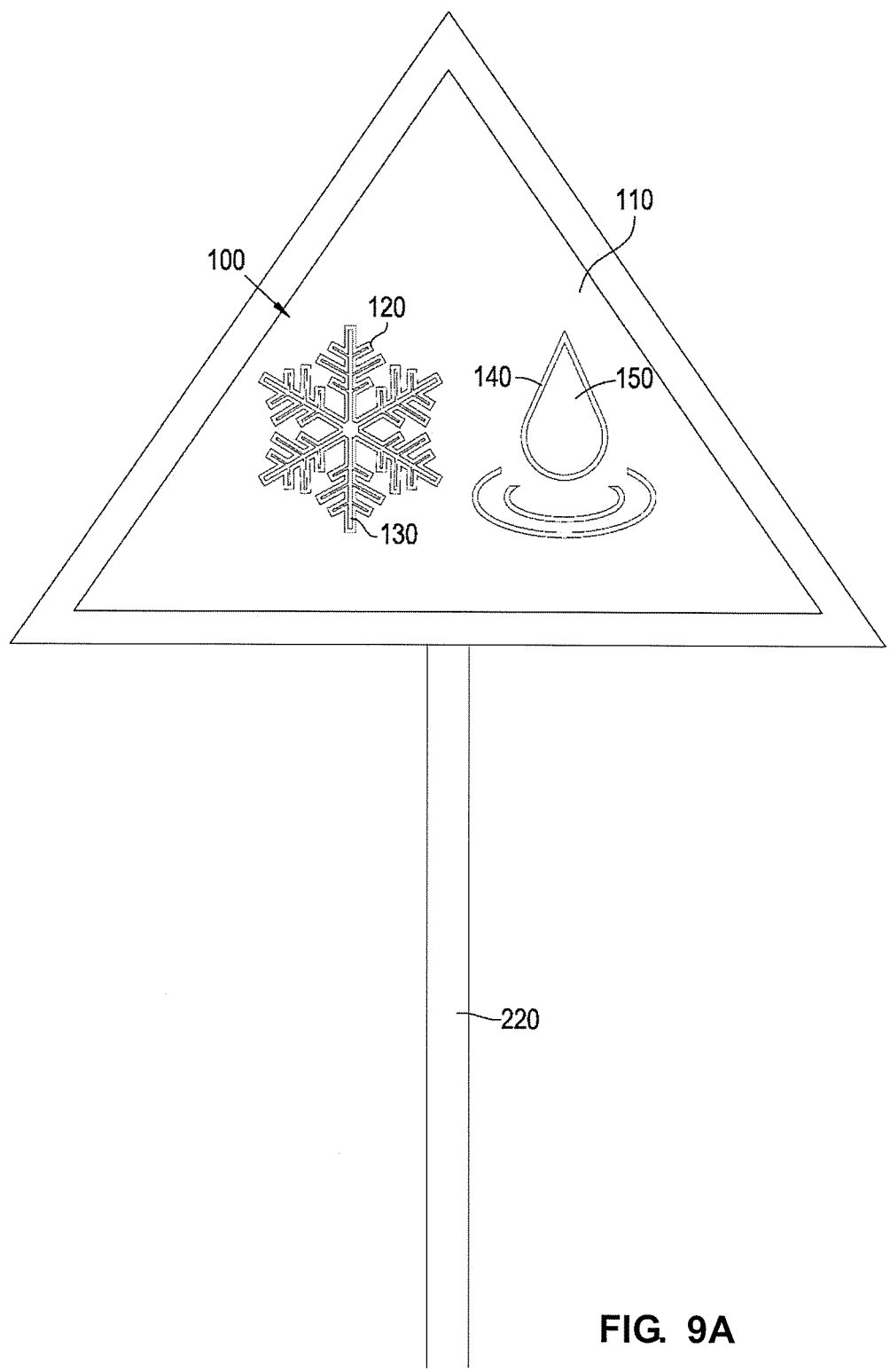
FIGS. 9A to 9C are diagrams showing examples of variable traffic safety signs for displaying roadbed conditions in response to changes in temperature and humidity applied to traffic safety sign boards according to one exemplary embodiment of the present invention.
Figure 9B:
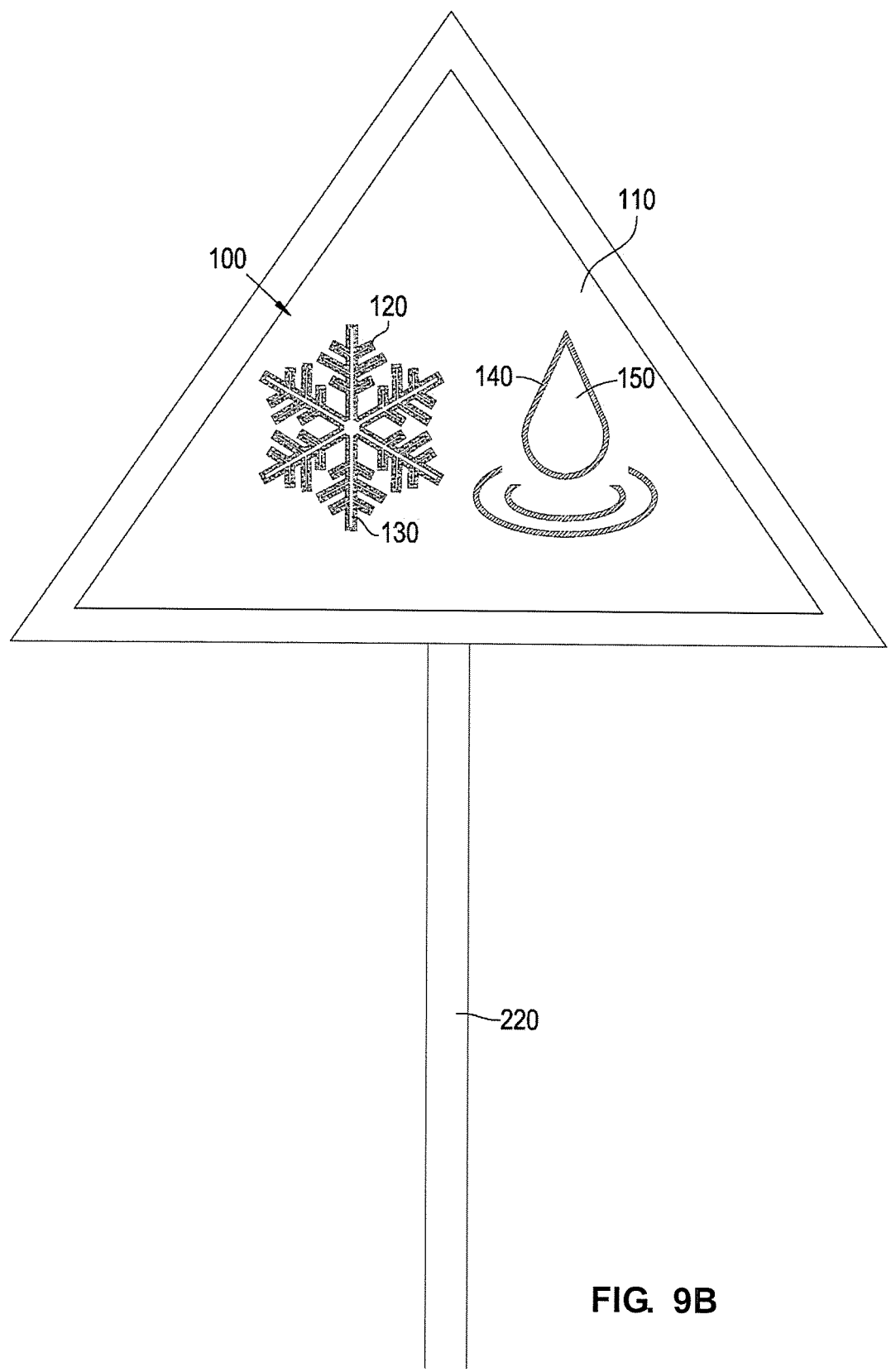
Figure 9C:
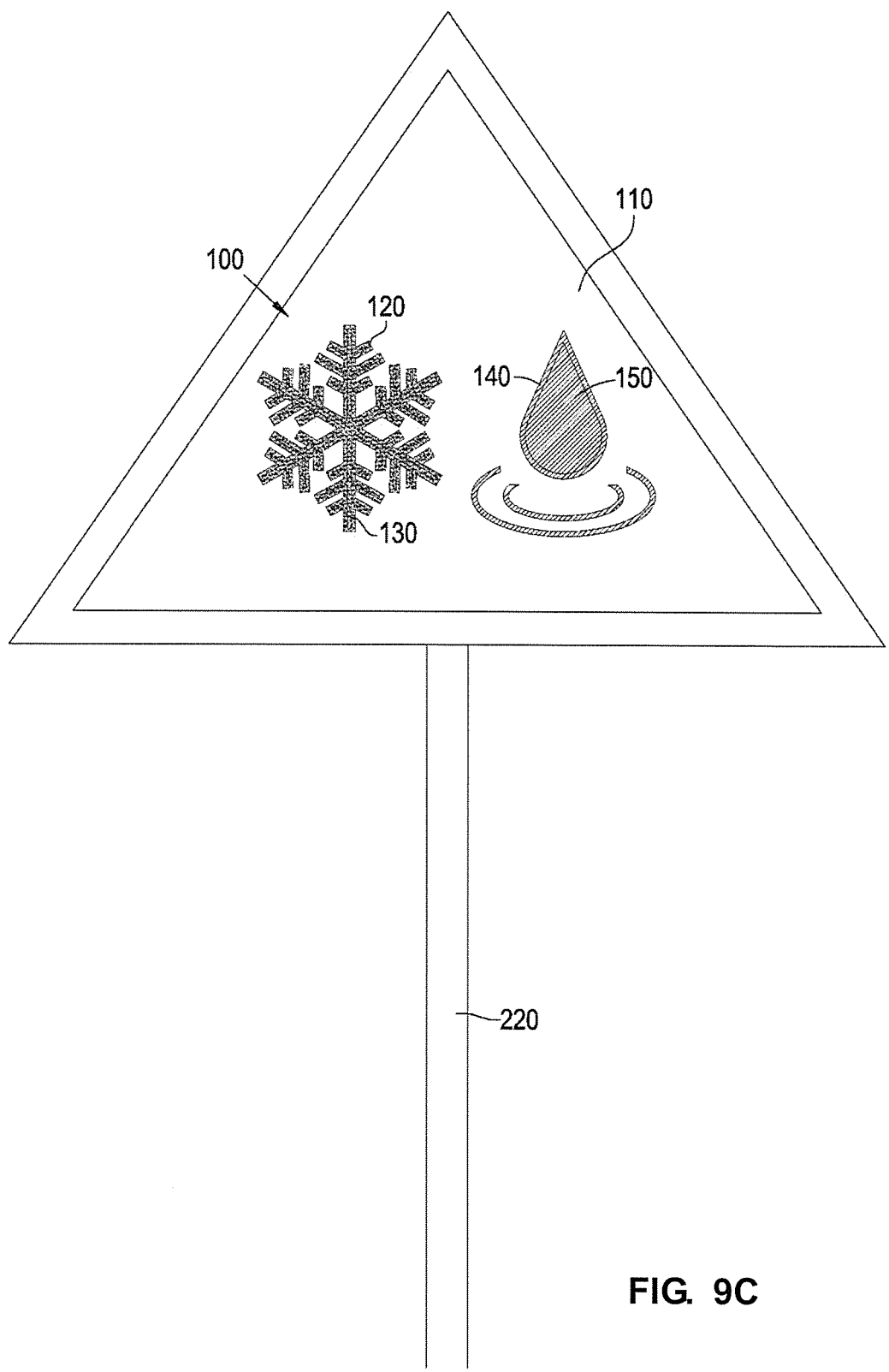

Meanwhile, FIGS. 9A to 9C are diagrams showing examples of variable traffic safety signs for displaying roadbed conditions in response to changes in temperature and humidity applied to traffic safety sign boards according to one exemplary embodiment of the present invention. Here, FIG. 9A shows a snowflake and a waterdrop shape when the temperature and humidity do not reach the threshold values, respectively, FIG. 9B shows a snowflake and a waterdrop shape when the temperature and humidity reach the threshold values, respectively, to form an interface, and FIG. 9C shows a snowflake and a waterdrop shape when the temperature and humidity exceed the threshold values, respectively.

Referring to FIGS. 9A to 9C, the variable traffic safety sign 100 for displaying roadbed conditions in response to changes in temperature and humidity according to one exemplary embodiment of the present invention may be applied to the traffic safety sign board 220. For example, the traffic safety sign board 220 is generally in a regular triangle, and an edge of the traffic safety sign board 220 is painted with a red line. As described above, the humidity and temperature are expressed as a figure or characters on a surface of such a traffic safety sign board 220 to promote driver safety.

Such a traffic safety sign board 220 is a sign for informing road users of roadbed conditions, and thus is installed at places where it is necessary to inform road users or users of surrounding roads of the risk for accidents due to the roadbed conditions of the road or caution the road users so as to enable the road users to properly cope with the roadbed conditions. In particular, the traffic safety sign board 220 is installed at places in which drivers are induced to drive at a reduced speed or the drivers' attention is called to the risk for accidents by informing the road user in advance of the corresponding risk factors at places where road surface freezing, water film formation, and the like often occur due to weather conditions such as snow, rain, frost, etc. An installation position of such a traffic safety sign board 220 is located 50 to 500 yards ahead from a place where there are risk factors. In this case, the traffic safety sign board 220 may be installed at the right of the road, but the present invention is not limited thereto.

Accordingly, when the variable traffic safety sign for displaying roadbed conditions in response to changes in temperature and humidity according to one exemplary embodiment of the present invention may be applied to traffic safety sign boards, economic feasibility may be secured, and the variable traffic safety sign may be readily applied to the existing public roads and bridges.

Figure 10A:
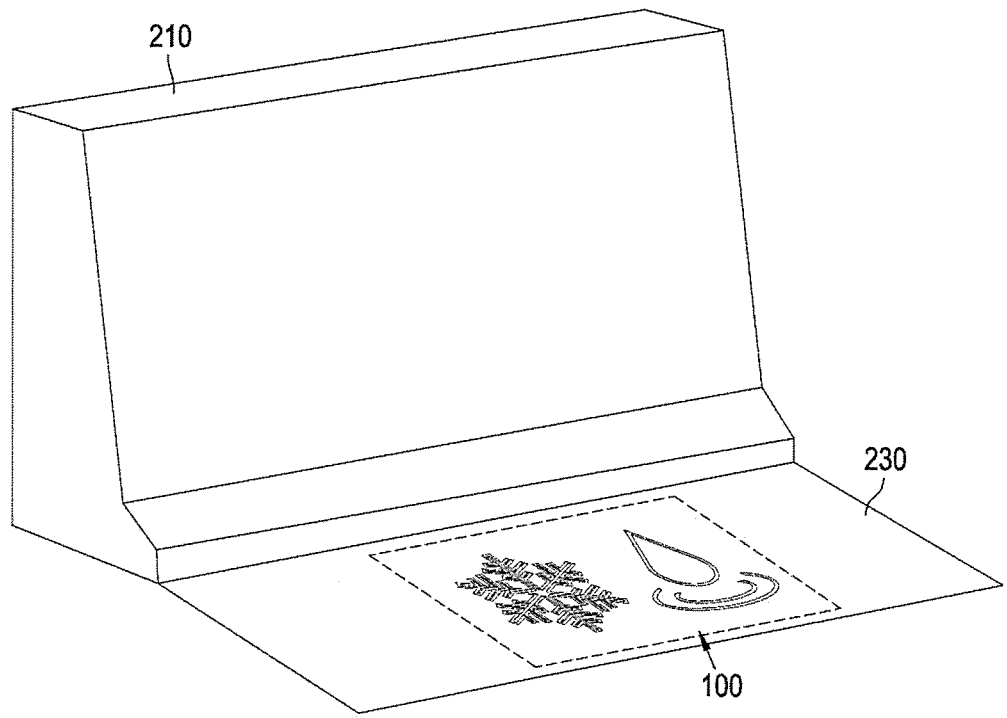
FIGS. 10A to 10C are diagrams showing examples of variable traffic safety signs for displaying roadbed conditions in response to changes in temperature and humidity installed at road shoulders according to one exemplary embodiment of the present invention.
Figure 10B:
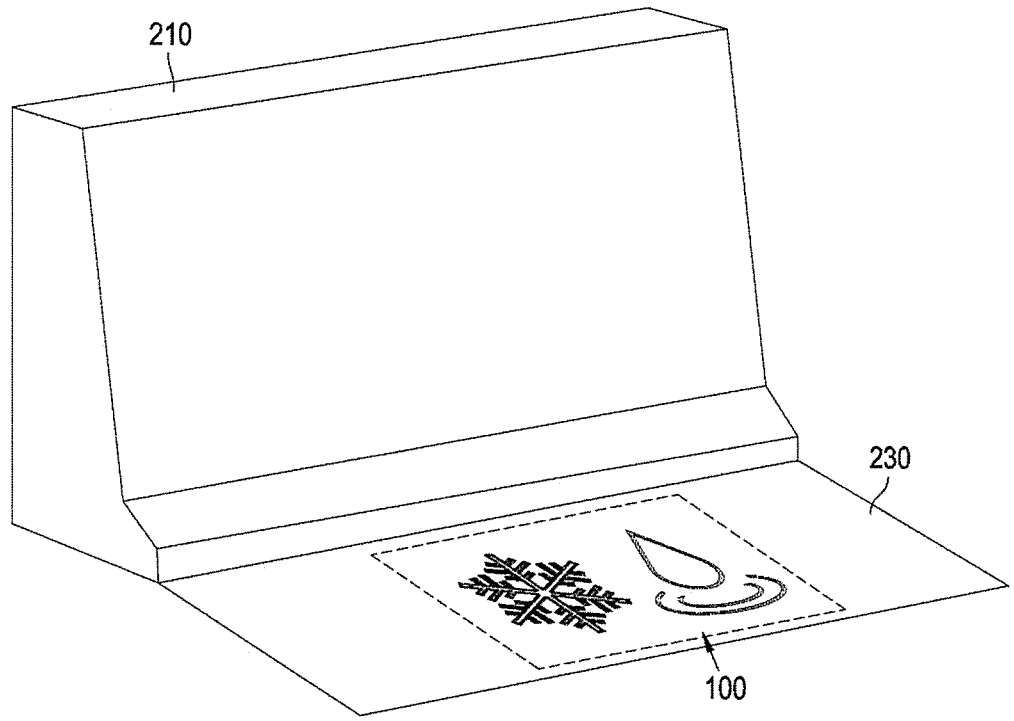
Figure 10C:
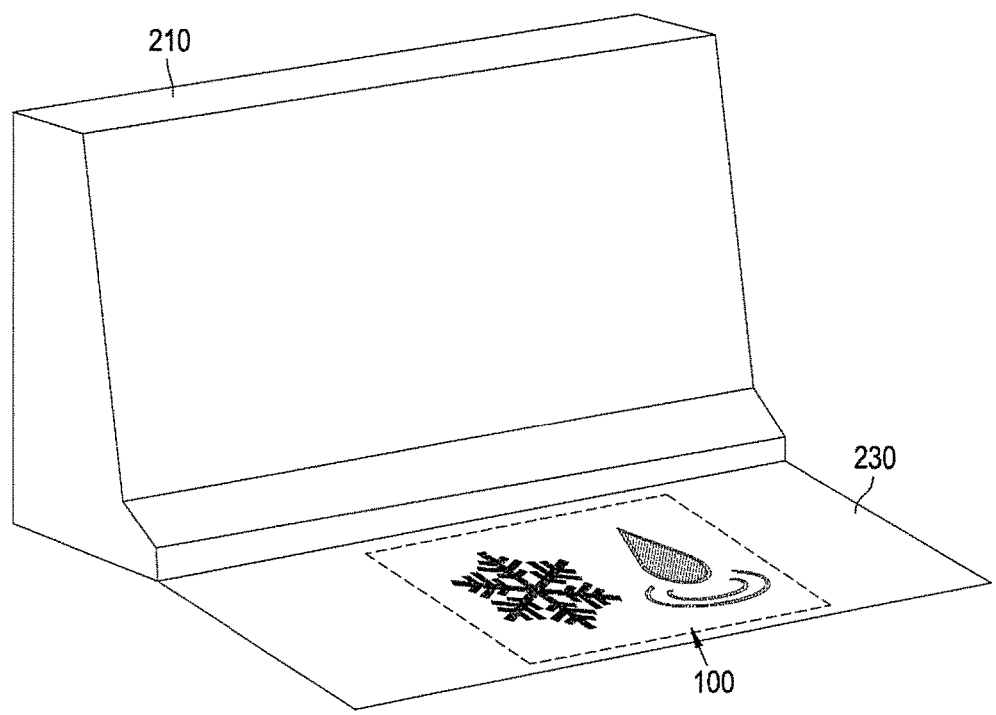

Meanwhile, FIGS. 10A to 10C are diagrams showing examples of variable traffic safety signs for displaying roadbed conditions in response to changes in temperature and humidity installed at road shoulders according to one exemplary embodiment of the present invention. Here, FIG. 10A shows a snowflake and a waterdrop shape when the temperature and humidity do not reach the threshold values, respectively, FIG. 10B shows a snowflake and a waterdrop shape when the temperature and humidity reach the threshold values, respectively, to thin' an interface, and FIG. 10C shows a snowflake and a waterdrop shape when the temperature and humidity exceed the threshold values, respectively.

Referring to FIGS. 10A to 10C, the variable traffic safety sign 100 for displaying roadbed conditions in response to changes in temperature and humidity according to one exemplary embodiment of the present invention may be installed at a road shoulder 230. That is, the waterdrop shape painted with the above-described HIC material or the snowflake shape painted with the thermochromic paint may be directly painted on a surface of the road, as shown in FIG. 10A. In this case, directly painting the waterdrop or snowflake shape on a surface of the road using the HIC material or the thermochromic paint has an advantage in directly expressing the humidity and temperature of the road surface rather than the humidity of the air or surroundings. When such a shape is painted on the road surface, it is desirable to form the shape outside a traffic lane and in the road shoulder 230 in which the paints are less likely to be worn down or damaged due to vehicle traffics.

Figure 11:
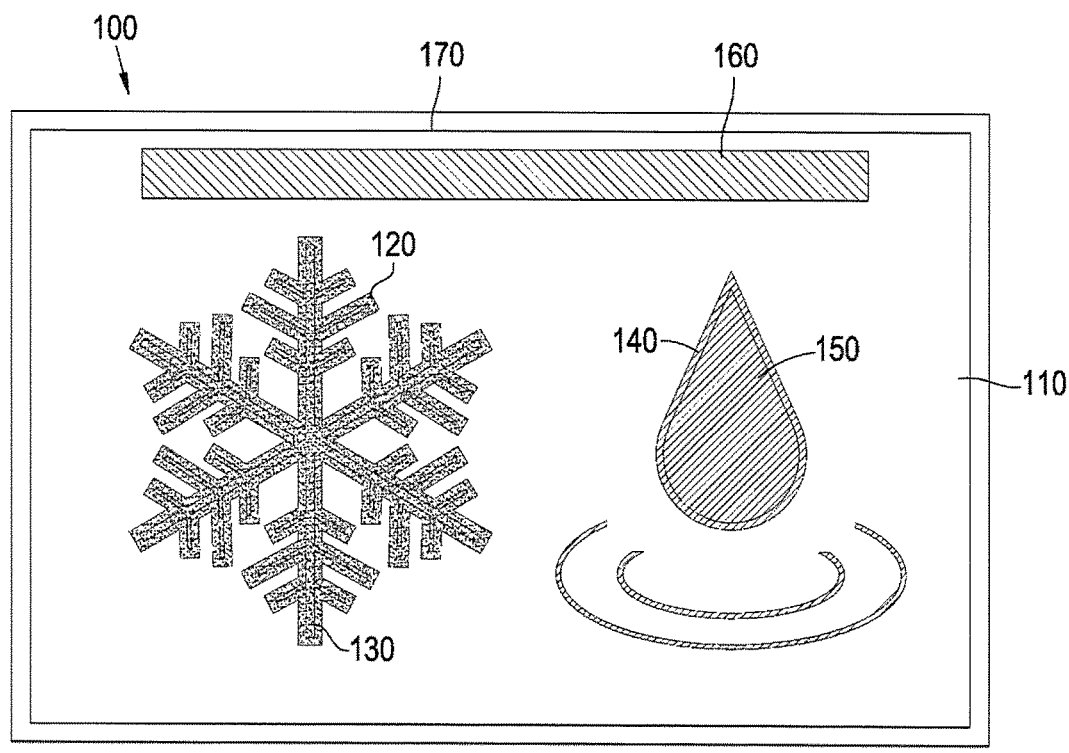
FIG. 11 is a diagram showing a light-reflecting material and a luminous material applied to the variable traffic safety sign for displaying roadbed conditions in response to changes in temperature and humidity according to one exemplary embodiment of the present invention.

Meanwhile, FIG. 11 is a diagram showing a light-reflecting material and a luminous material applied to the variable traffic safety sign for displaying roadbed conditions in response to changes in temperature and humidity according to one exemplary embodiment of the present invention.

A variable traffic safety sign 100 for displaying roadbed conditions in response to changes in temperature and humidity according to one exemplary embodiment of the present invention may further include a light-reflecting paint 160 and a luminous paint 170, as shown in FIG. 11.

The light-reflecting paint 160 may be formed of a light-reflecting material, and applied onto an inner side of the general paint 110 so that drivers driving on the road or bridge section can secure visibility at night, but the present invention is not limited thereto.

The luminous paint 170 may be formed of a luminous material, and applied onto an outer side of the general paint 110 so that drivers driving on the road or bridge section can secure visibility at night, but the present invention is not limited thereto.

According to the present invention, the variable traffic safety sign can be useful in informing road users of the possibility of a surface of a road or bridge section being wet or frozen without using an additional external power source by exactly expressing freezing and wet roadbed conditions of the road or bridge section using a thermochromic paint and a humidity indicator paint.

According to the present invention, the variable traffic safety sign can be useful in allowing road drivers to exactly recognize the roadbed conditions of the road or bridge section by displaying the freezing and wet roadbed conditions of the road or bridge section in response to changes in temperature and humidity, respectively, thereby preventing the risk of accidents.

According to the present invention, the variable traffic safety sign can be readily applicable to structures such as a bridge crash barrier, a traffic safety sign board, a bridge railing, a road shoulder, and an inner part, entrance and exit of a tunnel.

The above description merely describes exemplary embodiments of the scope of the present invention, and it will be apparent to those skilled in the art that various changes and modifications can be made to the above-described exemplary embodiments of the present invention without departing from the scope of the invention. Accordingly, the exemplary embodiments of the present invention are not intended to limit the scope of the invention but to describe the invention. For example, individual components described in an integral form may be implemented in a dispersed form, and individual components described in a dispersed form may also be implemented in an integral form.

The scope of the present invention is defined by the appended claims, and encompasses all modifications and alterations derived from meanings, the scope and equivalents of the appended claims.

[Brief Description of Main Parts in the Drawings]

| | |
|---|---|
| 100: variable traffic safety sign | 110: general paint |
| 120: first thermochromic paint | 130: second thermochromic paint |
| 140: first humidity indicator paint | 150: second humidity indicator paint |
| 160: light-reflecting paint | 170: luminous paint |
| 210: crash barrier | 220: traffic safety sign board |
| 230: road shoulder | |

What is claimed is:

1. A variable traffic safety sign for displaying roadbed conditions in response to changes in temperature and humidity to inform road users of the possibility of a surface of a road or bridge section being wet or frozen, comprising:
    a general paint applied onto the traffic safety sign for use as a background color;
    a first thermochromic paint formed of a first thermochromic material and applied to develop a first color different from the background color at a first predetermined temperature so as to reveal an outline of a shape formed by the first thermochromic paint distinguishable from the background color;
    a second thermochromic paint for freezing display formed of a second thermochromic material, which develops a second color different from the background color at a second temperature lower than the first predetermined temperature as to fill an inner area the outline formed by the first thermochromic paint with the second color to indicate freezing conditions of the road or bridge section;

a first humidity indicator paint formed of a material for a first humidity indicator card (HIC) and applied to develop a third color different from the background color at a first predetermined relative humidity so as to reveal an outline of a shape formed by the first humidity indicator paint which is distinguishable from the background color; and a second humidity indicator paint formed of a material for a second humidity indicator card, which develops a fourth color different from the background color at a second humidity higher than the first predetermined relative humidity as to fill an inner area of the outline formed by the first humidity indicator card with the fourth color to indicate wet roadbed conditions of the road or bridge section, wherein the first and second thermochromic paints and the first and second humidity indicator paints indicate freezing and wet roadbed conditions of the road or bridge section via colors distinguishable from the background color, respectively, without using an external power source.

2. The variable traffic safety sign of claim 1, wherein a color developing temperature of the first thermochromic paint and a color developing humidity of the first humidity indicator paint are adjusted in response to field situations of the road or bridge section.

3. The variable traffic safety sign of claim 2, wherein the color developing temperature of the first thermochromic paint is the freezing point of 32° F., and the color developing humidity of the humidity indicator paint is a relative humidity of 80%.

4. The variable traffic safety sign of claim 1, wherein a shape formed by the first and second thermochromic paints is a figure including a snowflake shape or characters including "CAUTION: ICY ROAD" or "BRIDGE ICES" so that drivers in vehicles traveling on a road can quickly and easily recognize the possibility of a surface of the road being frozen.

5. The variable traffic safety sign of claim 4, wherein the figure and the characters allow a color index according to the absolute temperature value to appear on a traffic safety sign board at the same time so that road drivers can check a current outdoor temperature.

6. The variable traffic safety sign of claim 1, wherein a shape formed by the first and second humidity indicator paints is a figure including a waterdrop shape or characters including "WET ROAD" or "WET SURFACE" so that drivers in vehicles traveling on the road can quickly and easily recognize the possibility of a surface of the road being wet.

7. The variable traffic safety sign of claim 6, wherein the figure and the characters allow a color index according to the absolute humidity value to appear on a traffic safety sign board at the same time so that road drivers can check a current outdoor absolute humidity.

8. The variable traffic safety sign of claim 1, further comprising a light-reflecting paint formed of a light-reflecting material and applied onto an inner side of the general paint so that drivers driving on the road or bridge section can ensure visibility at night.

9. The variable traffic safety sign of claim 1, further comprising a luminous paint formed of a luminous material and applied onto an outer side of the general paint so that drivers driving on the road or bridge section can secure visibility at night.

10. A structure comprising a variable traffic safety sign for variably displaying roadbed conditions in response to changes in temperature and humidity to inform road users of the possibility of a surface of a road or bridge section being wet or frozen, wherein the variable traffic safety sign comprises:

a first thermochromic paint formed of a first thermochromic material and applied to develop a first color different from the background color at a first predetermined temperature so as to reveal an outline of a shape formed by the first thermochromic paint distinguishable from the background color;

a second thermochromic paint for freezing display formed of a second thermochromic material, which develops a second color different from the background color at a second temperature lower than the first predetermined temperature as to fill an inner area of the outline formed by the first thermochromic paint with the second color to indicate freezing conditions of the road or bridge section;

a first humidity indicator paint formed of a material for a first humidity indicator card (HIC) and applied to develop a third color different from the background color at a first predetermined relative humidity so as to reveal an outline of a shape formed by the first humidity indicator paint which is distinguishable from the background color; and a second humidity indicator paint formed of a material for a second humidity indicator card, which develops a fourth color different from the background color at a second humidity higher than the first predetermined relative humidity as to fill an inner area of the outline formed by the first humidity indicator card with the fourth color to indicate wet roadbed conditions of the road or bridge section.

11. The structure of claim 10, wherein the structure in which the variable traffic safety sign is installed comprises one or more is selected from the group consisting of a bridge crash barrier, a traffic safety sign board, a bridge guardrail, a road shoulder, and an inner part, entrance and exit of a tunnel.

12. The structure of claim 10, wherein the first and second thermochromic paints and the first and second humidity indicator paints of the variable traffic safety sign display freezing and wet roadbed conditions of the road or bridge section, respectively, without using an external power source.

13. The structure of claim 10, wherein a color developing temperature of the first thermochromic paint and a color developing humidity of the first humidity indicator paint are adjusted in response to field situations of the road or bridge section.

14. The structure of claim 13, wherein the color developing temperature of the first thermochromic paint is the freezing point of 32° F., and the color developing humidity of the humidity indicator paint is a relative humidity of 80%.

15. The structure of claim 10, wherein the variable traffic safety sign further comprises:

a light-reflecting paint formed of a light-reflecting material and applied onto an inner side of the general paint so that drivers driving on the road or bridge section can secure visibility at night; and a luminous paint formed of a luminous material and applied onto an outer side of the general paint so that drivers driving on the road or bridge section can secure visibility at night.

\* \* \* \* \*